Dec. 21, 1948. J. NAPOLI 2,456,834
PROPULSION MEANS FOR BOATS
Filed Jan. 31, 1945
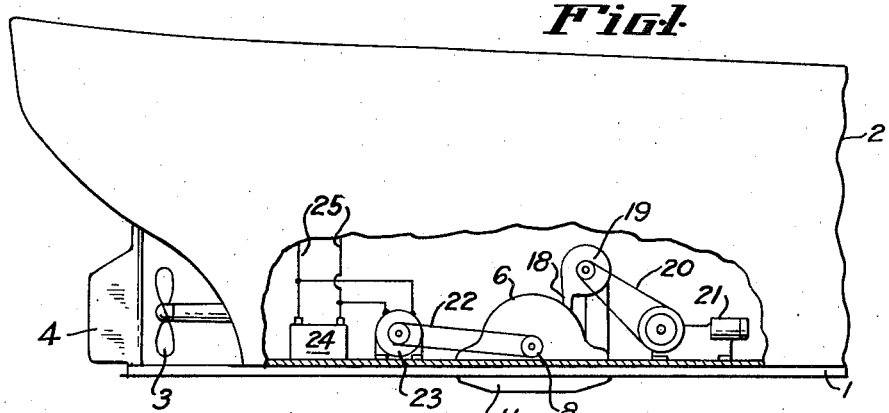
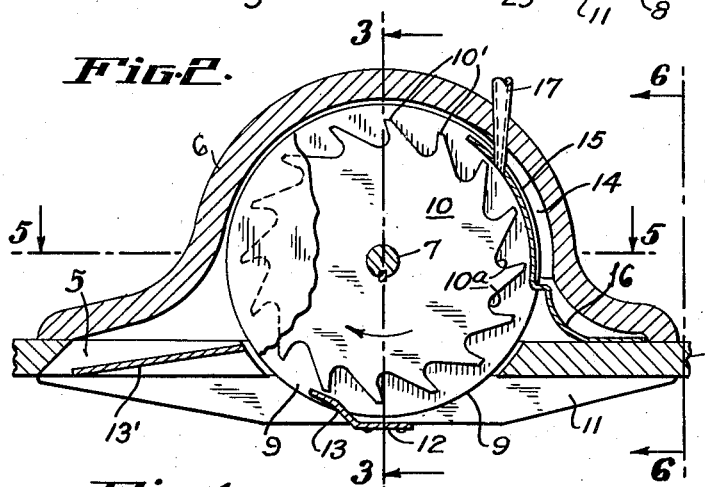
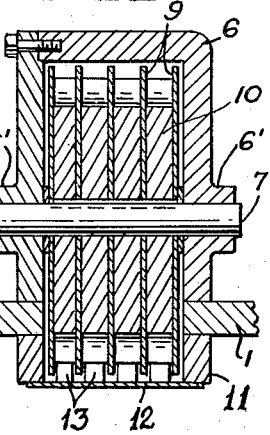
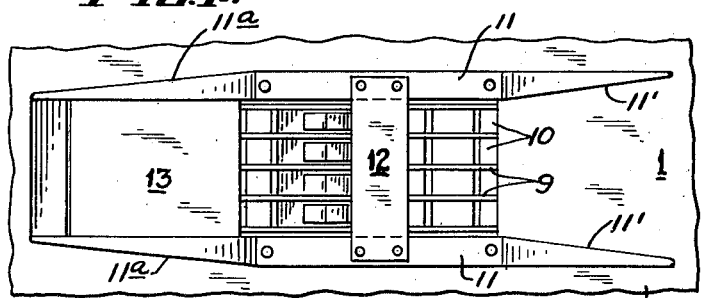
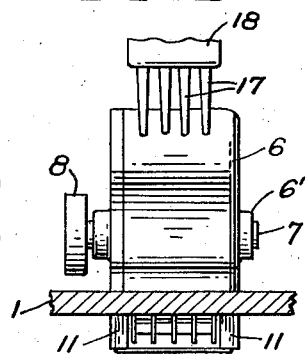
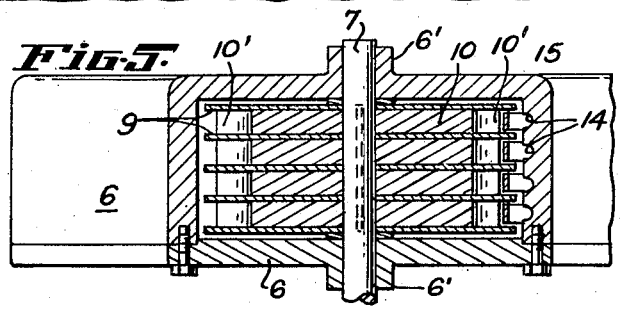
INVENTOR.
John Napoli
BY
J. E. Trabucco
ATTORNEY.

Patented Dec. 21, 1948

2,456,834

UNITED STATES PATENT OFFICE 2,456,834

PROPULSION MEANS FOR BOATS

John Napoli, Monterey, Calif.

Application January 31, 1945, Serial No. 575,446

2 Claims. (Cl. 170—104)

This invention relates to improvements in propulsion means for marine vessels, and more particularly to a novel combination by which electrical energy may be generated while a vessel is being propelled through the water.

An object of my invention is to provide an improved propulsion system for marine vessels or other types of boats which is arranged to operate an electrical generating plant as the vessel is propelled forwardly through the water, thereby generating electrical energy to be stored and used for various purposes in and about the vessel.

Another object of my invention is to provide improved means for generating electrical energy comprising a number of rotors keyed to a rotatable shaft and arranged in spaced relation in channels or compartments through which currents of water may be directed to impart rotary motion to the rotors.

Other objects and advantages will be pointed out hereinafter, indicated in the appended claims, or will be obvious to one skilled in the art upon an understanding of the present disclosure. For the purpose of this application, I have elected to show herein certain forms and details of a marine vessel representative of my invention. It is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawings:

Fig. 1 is a side elevation of a part of a boat, showing, diagrammatically, an electrical generating and distributing plant embodying the preferred principles of my invention;

Fig. 2 is a vertical section taken longitudinally through a rotary device used to operate an electrical generator;

Fig. 3 is a sectional view taken on the line 3—3 of Fig. 2;

Fig. 4 is a bottom view of the rotary device;

Fig. 5 is a sectional view taken on the line 5—5 of Fig. 2; and

Fig. 6 is an end view of the rotary device.

Referring to the drawings, the numeral 1 designates the keel portion of a marine vessel or other type of boat, 2 the hull, 3 a propeller which is suitably connected to a source of power, such as an electrical motor or an internal combustion engine, and 4 the rudder.

The keel portion of the boat is provided with a suitably shaped slotted opening 5 over which is positioned and secured a housing 6. Rotatably extending through the housing 6 and supported in axial bearings 6' is a shaft 7 which is provided at one end with a pulley 8. Mounted on the shaft are a plurality of spaced discs or plates 9 of substantially circular shape between which are positioned rotors 10. The rotors extend partially through the opening in the keel and being suitably keyed to the shaft 7 cause the latter to rotate in a clockwise direction, as hereinafter described. The rotors 10 are provided at their peripheries with a number of spaced projections or teeth 10' which are distributed circumferentially and are so shaped as to form spaced grooves or pockets 10a. The discs 9 are somewhat larger at their diameters than the rotors, thereby forming annular channels or spaces at the peripheries of the rotors which are enclosed by the discs. Each rotor may be formed with a greater or less number of peripheral teeth and grooves than shown on the drawings, but for all practical purposes satisfactory results may be obtained by providing sixteen, or as many as thirty-two, spaced projections at the periphery of each rotor.

Secured to and extending below the keel 1 and positioned at opposite sides of the opening 5 are longitudinally disposed members 11 which are provided with converging opposed surfaces 11' at their forward ends which provide a gradually narrowing channel therebetween for increasing the velocity of water proceeding rearwardly. The members 11 at their rear ends are formed with converging surfaces 11a which, when the boat is proceeding forwardly through the water, prevent the forming of eddies or back pressures that might interfere with the forward movement of the boat.

Carried by a transverse support 12 secured centrally to the members 11 are a plurality of upwardly disposed deflectors 13 which extend into the annular channels located between spacing discs 9. The upper ends of the deflectors 13 are positioned in slightly spaced relation to the ends of the teeth 10', but each is so arranged as to tangentially direct water which proceeds rearwardly between the members 11 into the pockets between the teeth 10' and against the forward sides of the latter. Thus as the boat is propelled in a forward direction in the usual manner, water is directed between the members 11 with increasing velocity and tangentially with respect to the rotors 10 against the teeth 10' of the latter. The rotors are thereby rotated in a clockwise direction to cause the shaft 7 to similarly rotate. An inclined transverse plate 13' is arranged at the rear end of the opening 5 to convey water falling thereon rearwardly to prevent its interference with the rotation of the rotors.

The forward end of the housing is provided with spaced grooves 14, and arranged between the said grooves and the rotors 10 are spaced deflectors 15 which extend upwardly from a support 16 between the discs 9. Extending through the housing 6 and also through the deflectors 15 are inlet pipes or nozzles 17 which are secured on a distributing manifold 18 that is supplied with a pressure fluid by a pump 19. The pump is connected by an endless belt 20 to a source of power 21, which may be an electric motor or an internal combustion engine. The nozzles 17 are arranged to direct water under pressure tangentially against the teeth 10' of the rotors, thereby causing their rotation. During the normal operation and forward movement of the boat the pump 19 is not in operation, but when at anchor the operation thereof may be commenced to cause the rotation of the rotors to generate electrical energy for use presently or later in and about the boat.

The pulley 8 secured to the shaft 7 is connected as by an endless belt 22 to an electric generator 23, and the latter is electrically connected by suitable wires to a storage battery 24. The electrical energy produced by the generator 23 is stored in the battery 24, and, through outlet wires 25, it may be supplied to any device or mechanism on the boat which is to be operated electrically.

What I claim is:

1. In a boat having a keel provided with an opening, a housing mounted on the keel and arranged above the opening, a shaft rotatably supported by the housing, a plurality of spaced circular rotors keyed to the shaft and having peripheral teeth, circular spacing discs interposed between the rotors, the discs being larger at their diameters than the rotors, whereby annular open channels are formed around the rotors, the said rotors and the discs being positioned with parts thereof projecting through the keel opening and below the keel, and means for directing water into the channels and against the teeth of the rotors as the boat is propelled forwardly, whereby the rotors are rotated to impart rotary motion to the shaft.

2. In a rotary device for use with boats, a rotatable shaft, a plurality of spaced rotors keyed to the shaft and having peripheral teeth arranged thereon, a plurality of spacing discs arranged at opposite sides of the rotors, the said discs each having a greater diameter than the rotors, whereby annular open channels are formed around the rotors, and means for directing currents of water into the channels and against the teeth of the rotors, whereby the rotors are made to rotate.

JOHN NAPOLI.

REFERENCES CITED

The following references are of record in the file of this patent:

UNITED STATES PATENTS

| Number | Name | Date |
|---|---|---|
| 328,447 | Brady | Oct. 13, 1885 |
| 700,408 | Derbyshire | May 20, 1902 |
| 904,892 | Pattosien | Nov. 24, 1908 |
| 1,029,127 | Jameson | June 11, 1912 |
| 1,293,110 | Karafas | Feb. 4, 1919 |
| 1,831,835 | Allee | Nov. 17, 1931 |
| 1,898,973 | Lansing | Feb. 21, 1933 |
| 1,922,606 | Voith | Aug. 15, 1933 |
| 2,339,575 | Lee | Jan. 18, 1944 |